United States Patent [19]
Boutet

[11] Patent Number: 5,246,326
[45] Date of Patent: Sep. 21, 1993

[54] AUTOLOADER FOR FILM CASSETTES

[75] Inventor: John C. Boutet, Rochester, N.Y.

[73] Assignee: Eastman Kodak Company, Rochester, N.Y.

[21] Appl. No.: 821,157

[22] Filed: Jan. 15, 1992

Related U.S. Application Data

[62] Division of Ser. No. 728,422, Jul. 11, 1991.

[51] Int. Cl.⁵ .............................................. B65G 1/00
[52] U.S. Cl. .................................................... 414/331
[58] Field of Search ............. 414/403, 411, 416, 417, 414/788.7, 788.4, 331, 792.7, 796.9, 797.8; 221/134; 53/244, 493, 237

[56] References Cited

U.S. PATENT DOCUMENTS

| | | | |
|---|---|---|---|
| 3,763,370 | 10/1973 | Hanson | 250/470 |
| 3,908,984 | 9/1975 | Sohngen | 271/113 |
| 4,049,142 | 9/1977 | Azzaroni | 414/403 X |
| 4,104,529 | 8/1978 | Gaudel | 250/470 |
| 4,162,407 | 7/1979 | Sharp | 250/468 |
| 4,276,478 | 6/1981 | Meszaros et al. | 250/468 |
| 4,496,273 | 1/1985 | Thate et al. | 414/411 |
| 4,539,794 | 9/1985 | Azzaroni | 53/493 |
| 4,687,403 | 8/1987 | Motoda | 414/788.4 |
| 4,720,228 | 1/1988 | Horiguchi et al. | 414/788.4 |
| 4,759,679 | 7/1988 | Muller | 414/416 |
| 4,775,138 | 10/1988 | Muller | 271/9 |
| 4,809,313 | 2/1989 | Gandolfo | 378/182 |
| 4,871,290 | 10/1989 | Kaczynski et al. | 414/416 X |
| 4,874,282 | 10/1989 | Orikasa et al. | 414/416 |
| 4,878,799 | 11/1989 | Seto et al. | 414/331 |
| 5,004,393 | 4/1991 | Lunka et al. | 414/416 X |
| 5,024,593 | 6/1991 | Hehl | 414/788.7 X |

FOREIGN PATENT DOCUMENTS

1-43420  2/1989  Japan .................................. 221/134

*Primary Examiner*—David H. Bollinger
*Attorney, Agent, or Firm*—Frank Pincelli

[57] ABSTRACT

An autoloader for use with a computed radiography reader receives a stack of pallets on a platform. Each pallet has registered thereon a cassette containing a photographic element that is to be read by the reader. The pallets each have side rails with openings therein. The platform is raised and lowered relative to the reader by an elevator to locate the pallets at a reading position wherein the element in the cassette is read. Pins engage the openings in the pallet at the reading position to support that pallet independent of the platform. The pallets are indexed to the reading position sequentially beginning with the lowermost pallet so that pallets with cassettes containing elements that have been read are at the bottom of the stack and can be removed while another pallet is at the reading position.

4 Claims, 6 Drawing Sheets

AUTOLOADER FOR FILM CASSETTES

This is a division of application Ser. No. 07/728,422, filed Jul. 11, 1991.

CROSS REFERENCE TO RELATED APPLICATION

Reference is made to commonly assigned, copending U.S. patent application Ser. No. 728,425, entitled "Pallet for Holding a Cassette", filed on Jul. 11, 1991 in the name of John C. Boutet.

BACKGROUND OF THE INVENTION

This invention relates to an autoloader for film cassettes, and more particularly to an autoloader for feeding cassettes to and receiving them from a computed radiography reader.

It is known from U.S. Pat. No. 4,878,799, issued Nov. 7, 1989, to provide an automatic machine for unloading film sheets from magazines More specifically, a machine as disclosed in such patent has moveable trays for supporting a plurality of magazines, and the trays are spaced from each other in a vertical direction. The trays are supported by an elevator for movement in a vertical direction as a unit When a tray is at a particular vertical position, the tray and magazine are moved to an unloading position where sheets in the magazine can be removed by suction cups. The removed sheets are then fed to a cassette or to a photographing device for exposure.

In computed radiography a photographic element, such as a storage phosphor sheet or rigid plate, is exposed to form a latent image. The exposed photographic element is taken to a reader where the photographic element is stimulated to emit a pattern of radiation that can be read and recorded. Then the photographic element is erased and can be reused again. It is common to manually transport the cassette containing the photographic element from the exposure apparatus to the reader and manually insert it into the reader. The operator then waits until the image is read, the photographic element is erased and returned to the operator. While this procedure may be satisfactory, it requires much time and effort by the operator. Operator time is increased when the reader is relatively slow in reading and erasing the photographic element, and this procedure can require more than a full minute of time It clearly is desirable to minimize the time required by an operator, and to do so in a way which makes it feasible to automate the feeding of a series of cassettes to the reader.

SUMMARY OF THE INVENTION

Accordingly, it is an object of the invention to provide an autoloader for film cassettes of the kind used in computed radiography which simplifies the handling of the cassettes and reduces the operator time required to provide cassettes to a reader.

Another object of the invention is to automate feeding of cassettes sequentially to a computed radiography reader.

In accordance with the present invention, an autoloader for a computed radiography reader is adapted to receive a plurality of pallets, with each pallet having thereon a cassette containing a photographic element The pallets have side rails for stacking the pallets one above another on the autoloader, and each side rail has an opening therein The autoloader comprises a platform for receiving one or more pallets with each such pallet containing a cassette Means connected to the platform raises and lowers the platform relative to the reader. Means are provided for engaging the openings in the side rails of a pallet to support the pallet independent of the platform at a predetermined location relative to the reader.

The invention and its objects and advantages will become more apparent in the detailed description of the preferred embodiment presented below.

BRIEF DESCRIPTION OF THE DRAWINGS

In the detailed description of the preferred embodiment of the invention presented below, reference is made to the accompanying drawings, in which.

DETAILED DESCRIPTION OF THE PREFERRED EMBODIMENTS

The autoloader of the invention uses pallets which hold cassettes that are to be provided to a computed radiography reader. Therefore, a pallet and the manner in which a cassette is registered on the pallet will initially be described, followed by a description of the autoloader. The pallet described is disclosed in the related application referenced above.

Figure 1:
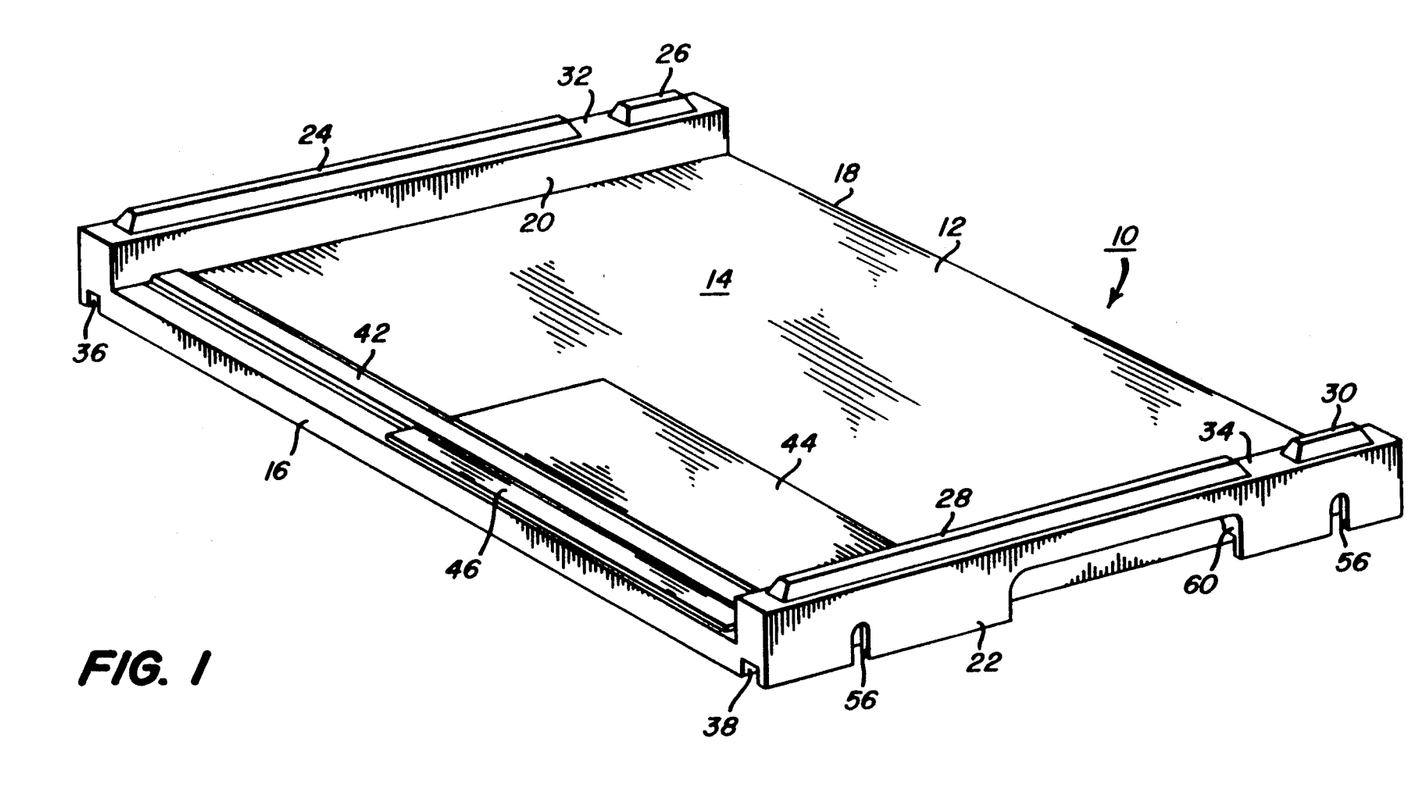
FIG. 1 is a perspective view illustrating a pallet used with the autoloader of the invention.
Figure 2:
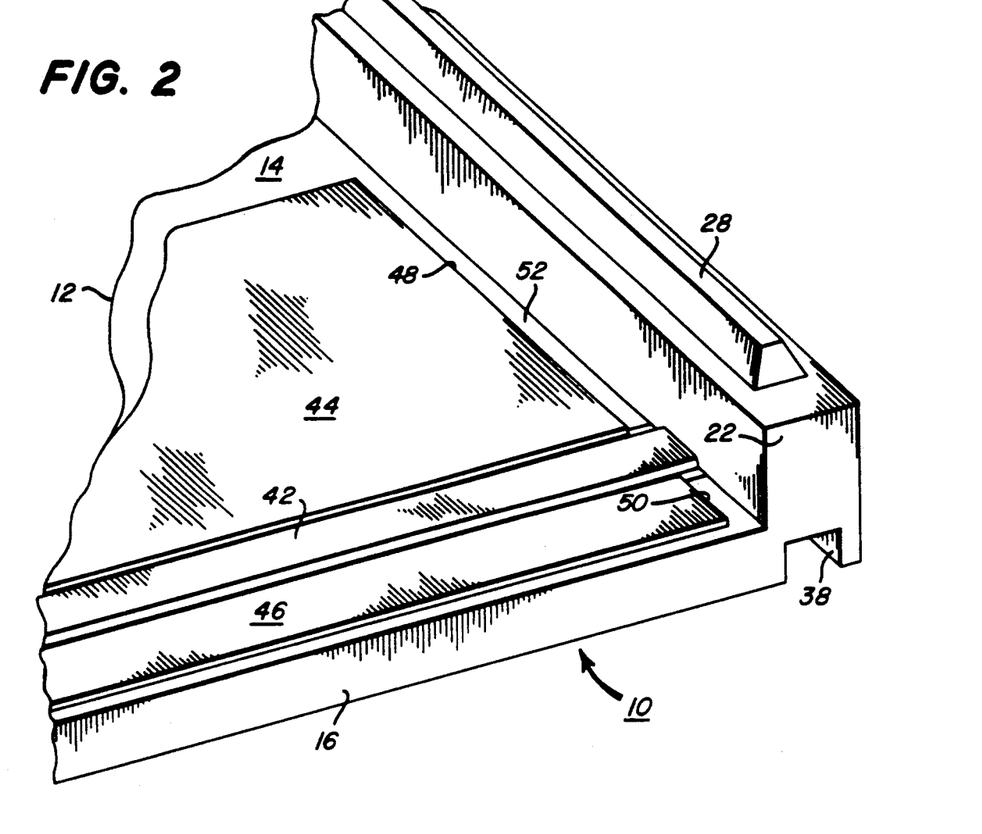
FIG. 2 is an enlarged fragmentary perspective view illustrating features of the pallet that register a cassette on the pallet.
Figure 3:
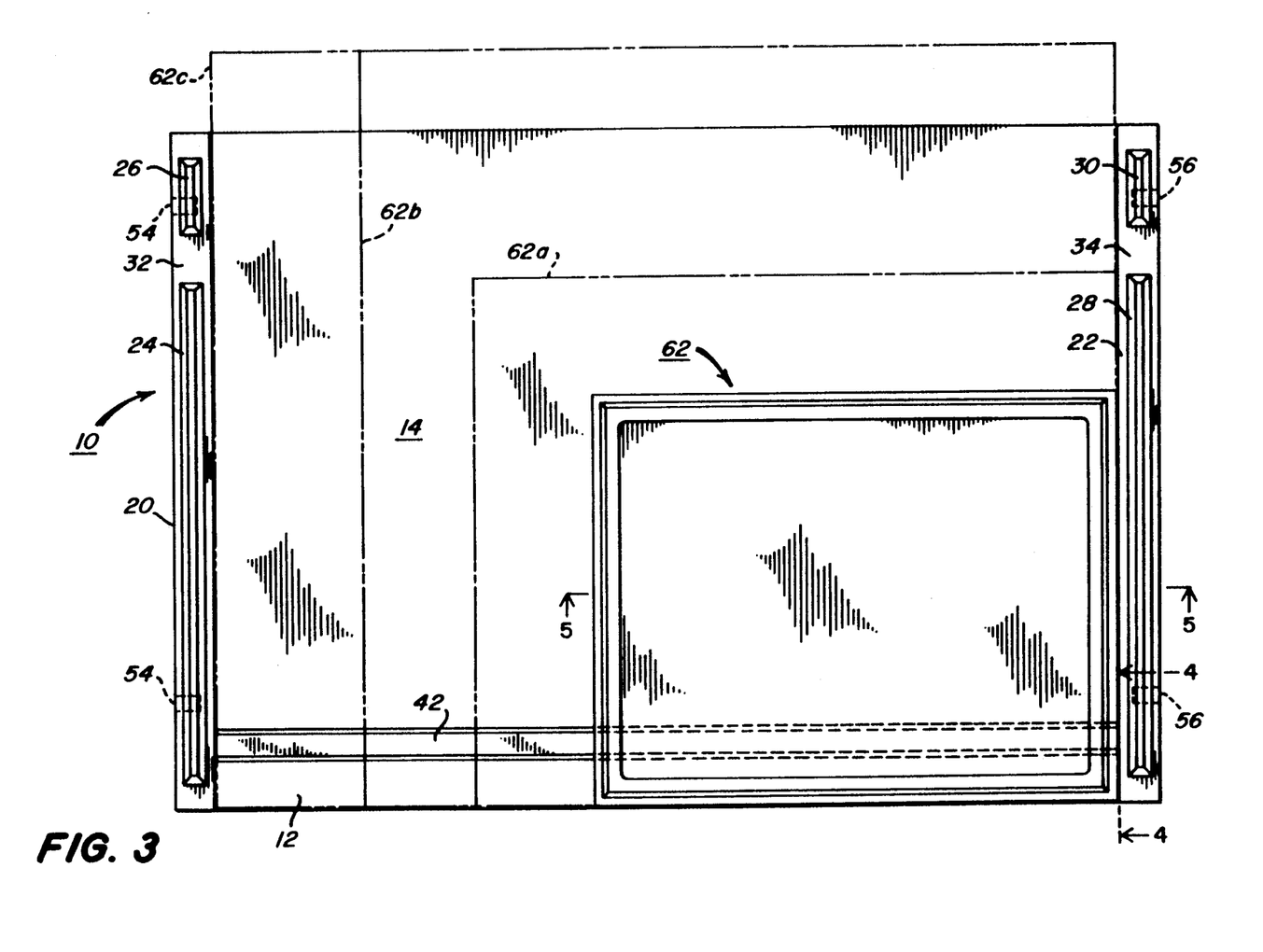
FIG. 3 is a plan view of the pallet showing a cassette registered on the pallet and illustrating in phantom cassettes of different sizes that can be carried by the pallet.

Referring initially to FIGS. 1-3, a pallet of the kind that can be used with an autoloader of the present invention is generally designated 10 and comprises a generally rectangular bottom plate 12 having a substantially flat upper surface 14. The plate has edges 16 and 18 that are parallel to each other and will be referred to herein as the front edge 16 and rear edge 18. The upper surface 14 of the pallet is adapted to receive and register a cassette as described later.

A pair of side rails, generally designated 20 and 22, are located along opposite sides of the surface 14 and extend in a direction perpendicular to edges 16,18. The rails extend the full distance from the front edge 16 to the rear edge 18 of the pallet and project above the surface 14 of the pallet by a distance sufficient to allow a similar pallet to be stacked on the top of the rails without interference with a cassette on the surface 14.

The rails are provided with locating means for accurately positioning one pallet on top of another pallet in a predetermined relationship. As illustrated in the drawings, the locating means comprises a pair of projections 24,26 on rail 20 and corresponding projections 28,30 on rail 22. Projections 24-30 are located on the top surface of the rails and preferably extend substantially the full length of the rails. However, projections 24,28 are substantially longer than the projections 26,30 with the ends of projections 24,28 being spaced from the projections 26,30 to leave relatively short spaces 32,34 between the pairs of projections. Projections 24, 26, 28 and 30 are preferably trapezoidal in shape, with the top and bottom being parallel to each other and with the top surface being narrower than the bottom of the projections.

The locating means also comprises elongate recesses 36,38 in the bottom surface of the rails 20,22, respectively. These recesses are illustrated as being rectangular in cross section and having a width substantially equal to or slightly wider than the maximum width of the projections 24-30. Thus, when one pallet 10 is stacked on top of another, the recesses 36,38 of the upper pallet receive the projections 24-30 of the lower pallet with the relative dimensions between the projections and recesses assuring a precise left-to-right alignment of the pallets with respect to each other. In case the pallets are slightly misaligned as they are being stacked, the lower corner of the recesses can slide along the tapered sides of the projections and effect precise alignment In order to establish precise alignment in a front-to-rear direction, recesses 36,38 each are interrupted near the rear edge 18 of the pallet by a downwardly projecting wall as shown at 40 in FIG. 6 for recess 38. Each wall 40 is located along the rail so that it enters one of the spaces 32,34 between the projections 24,26 or 28,30. The length of each wall 40 is substantially equal to the spacing between the projections on either of the rails 20,22 so that the wall serves to establish precise front and rear alignment of the rails of adjacent pallets. The ends of each wall 40 preferably extend in a vertical direction so that they can slide along the tapered end faces of the projections 24-30 as one pallet is lowered onto another one. The asymmetrical arrangement of projections 24-30 and walls 40 prevents stacking of pallets unless they are all oriented in the same manner. Thus, in a stack of pallets, the front edges 16 of all pallets are located one above the other.

Figure 4:
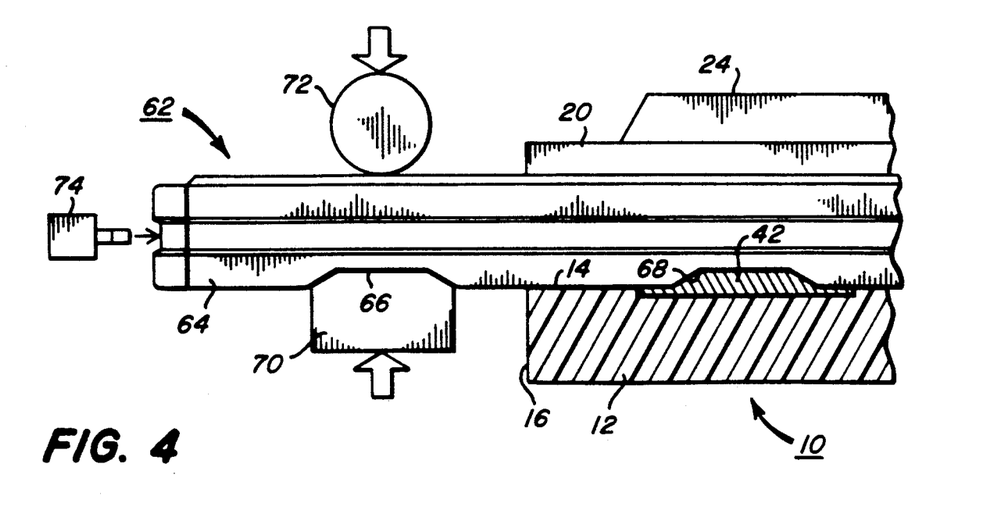
FIG. 4 is a fragmentary cross section through the pallet, taken along line 4—4 in FIG. 3, and further illustrating parts of a computed radiography reader.

The pallet is provided with means for registering cassettes of one or more sizes on the surface 14 of the pallet. More specifically, the registration means includes a rib 42 that extends from rail 20 to rail 22 at a position where it is adjacent but spaced from the front edge 16 of plate 12 and generally parallel to the front edge. As illustrated in FIG. 4, rib 42 preferably is recessed in the surface 14 of the plate and has side edge portions thereof with upper surfaces that are substantially coplanar with the surface 14 so that a cassette will not engage the vertical side edges of the rib. The top of the rib is flat and is elevated above surface 14. The top of the rib tapers downwardly to the side edge portions to facilitate movement of a cassette across the rib from one position to another. The rib serves to establish the position of the cassette in a direction perpendicular to the front and rear edges 16 and 18 of the pallet.

The registration means further comprises a pair of rectangular plates 44,46 that are secured to the upper surface 14 of the pallet. Plates 44,46 are located on opposite sides of the rib 42 and project above the upper surface 14 by a distance less than the top of the rib 42.

Figure 5:
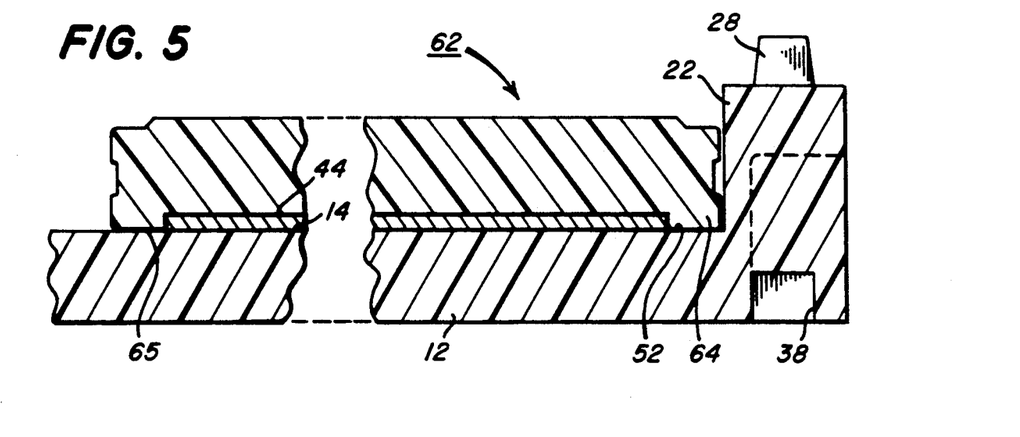
FIG. 5 is a fragmentary transverse cross section taken along line 5—5 of FIG. 3.

As best shown in FIGS. 2 and 5, the plates 44,46 have side edges 48,50 which are parallel to and spaced from rail the inner surface of 22 to form a shallow recess in the shape of a trough 52 on both sides of the rib 42. Trough 52 cooperates with a portion of the cassette to establish the registered position of the cassette between the rails 20,22.

Figure 6:
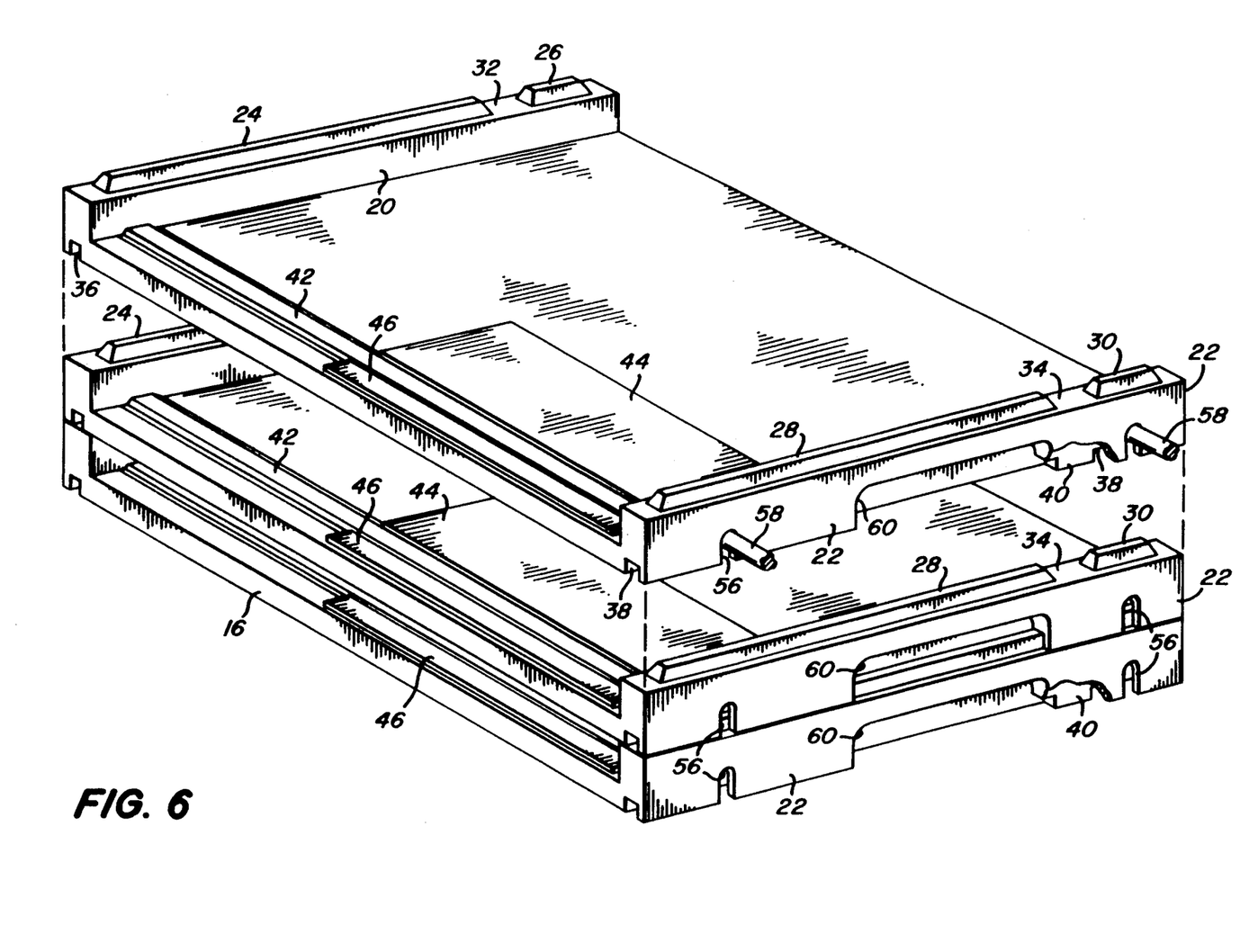
FIG. 6 is a perspective view illustrating the manner in which pallets can be stacked on top of each other.

Referring now to FIGS. 1, 3 and 6, rail 20 has a pair of slots 54 adjacent the front and rear edge of the pallet, and similar slots 56 are provided in the rail 22. Slots 54,56 extend from the bottom of the rails upwardly about half the height of the rails and by a distance that exceeds the width of the slots. Slots 54, 56 are adapted to receive pins 58 as shown in FIG. 6. Pins 58 can be part of an autoloader which handles pallets and cassettes so the cassettes can be fed to a read and erase unit of the kind used in computed radiography.

As shown in FIGS. 1 and 6, pallet 10 has a portion of each side rail 22 cut away to form a recess or handle 60 in the outer surface of the rail midway between the front and rear edges of the rail. Recess 60 preferably extends from the bottom edge of the rail upwardly about half way through the rail. Similar recesses (not shown) are provided in rail 20 of the pallet. These recesses enable a person to grasp and move the pallet by placing fingers in the recess 60 and on the top of the rails.

As mentioned previously, pallets 10 are adapted to receive and register cassettes of a kind suitable for use in computed radiography. A cassette of this kind is illustrated in FIGS. 3-5 and generally designated 62. The cassette is rectangular in shape and holds within the cassette a photographic element (not shown) on which an image is formed. As noted previously, the cassette is registered on the pallet 10 by rib 42 and the trough 52 formed by plates 44,46 and the adjacent side of the rail 22. More specifically, cassette 62 has a projecting edge or bead 64 (FIG. 5) which extends along the right side edge of the cassette and projects downwardly below the surface of the bottom of the cassette. This projecting edge or bead is dimensioned so that it fits within the trough 52 formed by plates 44,46 and the adjacent surface of the side rail 22, thereby locating the cassette in a left-to-right direction as viewed in FIGS. 3 and 5. Thus the right edge of the cassette is located against the inner wall of the rail 22.

As shown in FIG. 4, the edge or bead 64 has a pair of locating notches 66,68 that are spaced a short distance from each other. The notch 66 is adjacent but spaced from the front edge of the cassette. Notches 66,68 are shaped to conform to the upper surface of the rib 42, as shown in FIG. 4, so that when either of the notches 66,68 is aligned with the rib 42, the cassette is registered on the platen and located in a front-to-rear direction. When notch 66 is aligned with the rib 42, the cassette is located in the position illustrated in FIG. 3, wherein the front edge of the cassette is substantially co-planar with the front edge 16 of the pallet. When notch 68 is aligned with the rib 42, the front edge of the cassette is spaced from edge 16 of the pallet, as shown in FIG. 4, so that a portion of the cassette, including notch 66, projects from the edge of the pallet. This enables notch 66 to engage an alignment bar 70 while the top of the cassette is engaged by a roller 72 to firmly locate the front edge of the cassette at a predetermined position While in this position, the cassette is engaged by a mechanism shown generally at 74 for extracting the photographic element from the cassette. Bar 70, roller 72 and mechanism 74 can be part of a computed radiography reader, a portion of which is shown at 90 in FIG. 8.

A second edge or bead 65 (FIG. 5) can be provided along the left side edge of the cassette, i.e., the edge facing rib 20. This edge, like edge 64, projects downwardly below the bottom surface of the cassette and has locating notches, as shown at 66,68 for edge 64, to receive rib 42 and help align the cassette in each of two positions on the pallet.

Cassettes of different sizes can be located on the pallet 10. Thus, cassettes shown in phantom at 62a, 62b and 62c in FIG. 3 can also be located and registered on the upper surface 14 of the pallet. It will be understood that each of the cassettes 62a–62c will have edges or beads as shown at 64 and 65 for cassette 62, with each bead having a pair of notches as shown at 66,68 for the cassette 62.

As will be observed from FIG. 4, the thickness of cassette 62 is less than the height of rails 20 and 22 above the surface 14 of the pallet. In other words, the rails 20 project above the top surface of the cassettes. This enables several of the cassettes to be stacked one on top of each other, in the manner illustrated in FIG. 6, without interfering with movement of the cassette on any of the pallets in the stack.

Figure 7:
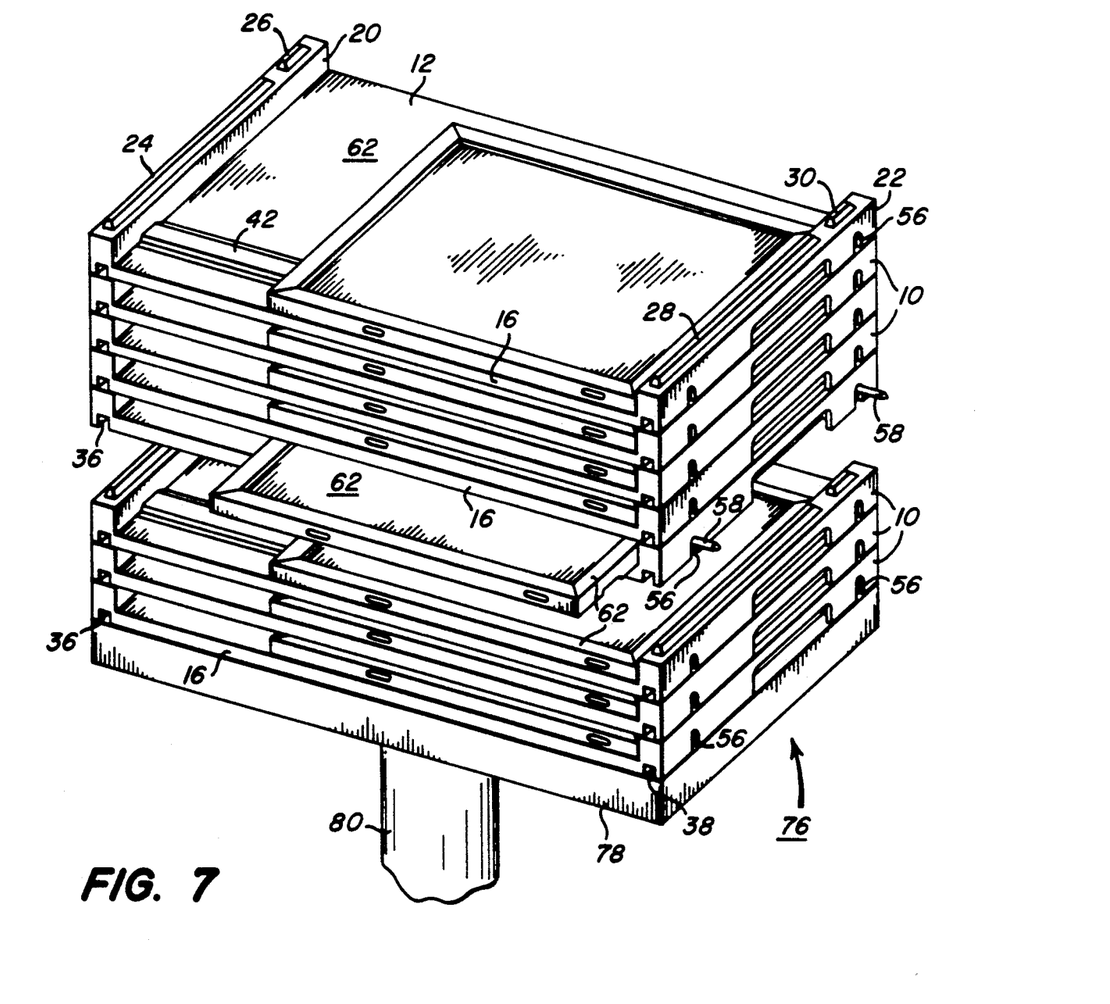
FIG. 7 is a fragmentary perspective view of a portion of an autoloader of the invention illustrating several pallets containing cassettes being located on the autoloader.
Figure 8:
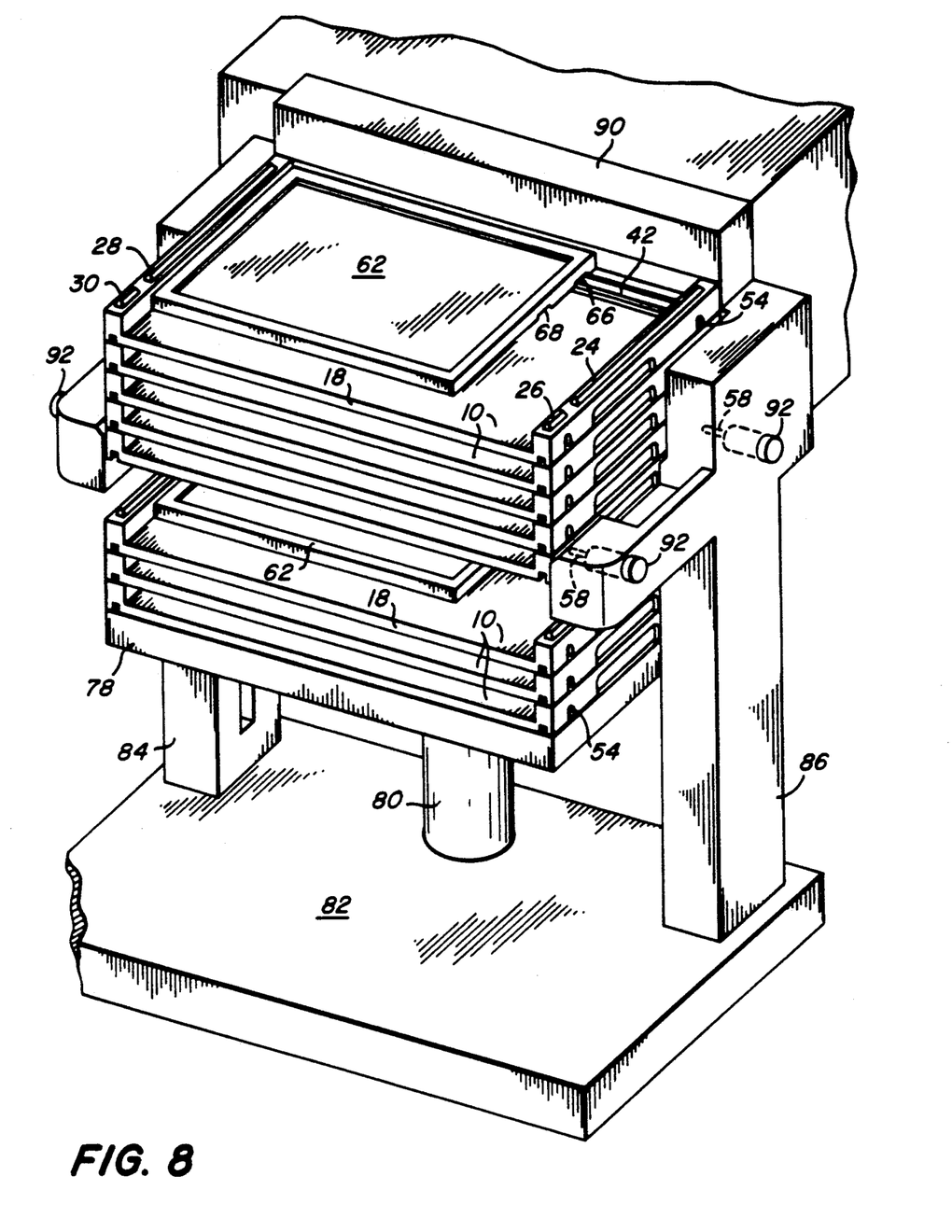
FIG. 8 is another perspective view of the autoloader and showing portions of a computed radiography reader for receiving cassettes from the autoloader.

Referring now to FIGS. 7 and 8, a preferred embodiment of an autoloader of the invention is generally designated 76. The autoloader comprises a flat, rectangular platform 78 which supports one or a stack of pallets 10 containing cassettes 62. The pallets are stacked one above another using the locating structures on the rails 20,22 to insure that the pallets and thus the cassettes are located directly above one another, and with one side edge of each cassette being adjacent the rail 22 of its respective pallet Platform 78 preferably has a length and width that is approximately equal to the length and width of a pallet 10 and, if desired, the upper surface of the platform can be provided with projections as shown at 24–30 for the pallets in order to accurately locate the lower-most pallet on the platform.

An elevator mechanism 80 is connected to the bottom of the platform 76 for raising and lowering the platform. Mechanism 80 may comprise a pneumatic or hydraulic cylinder or other linear actuator, such as lead screws, mounted on a base 82 of the autoloader and having a piston rod (not shown) connected to the bottom of platform 78 so that operation of the cylinder raises and lowers the platform.

The autoloader also comprises a pair of upright supports 84,86 positioned on opposite sides of the base 82 and located just outside of the path of travel of the platform 78. These supports could in an alternate design house the linear actuators such as lead screws, for the elevator. This would avoid the need for a pneumatic or hydraulic cylinder 80. The autoloader is positioned adjacent and abutting against a housing 90 of a computed radiography reader.

As mentioned previously, pins 58 are used for supporting a pallet 10 at a position with respect to the reader 90 so that a cassette on such supported pallet can be fed to the reader. Pins 58 may comprise the core or plunger of solenoids 92 (FIG. 8) carried by supports 84,86. Thus, operation of the solenoids 92 enable the pins 58 to be retracted from or extended into the recesses 56 of a pallet.

Operation of the autoloader 76 will be described with reference to FIGS. 7 and 8. In these figures, the platform 78 supports three pallets containing magazine 62, while the pins 58 are engaged in the slots 54,56 of the next higher pallet. This pallet, in turn, supports four additional pallets. Cassette 62 in the pallet supported by pins 58 is shown in FIG. 7 as partially withdrawn from the pallet to its extended position where, as shown in FIG. 4, the photographic element therein can be withdrawn and fed into the reader 90 for reading of the latent image on the photographic element. After the element has been returned to the cassette and the cassette returned to the pallet supported by pins 58, elevator 80 is activated to raise platform 78. Upward movement continues until the top pallet supported on the platform 78 engages and then lifts the pallet supported by pins 58 a short distance in order to relieve the pressure on the pins 58. Then the elevator stops and the solenoids 92 are operated to withdraw the pins 58 from the pallet.

Next, the elevator mechanism 80 is operated to lower platform 78 until the slots 54,56 in the next higher pallet are aligned with the pins 58. The elevator is stopped and the solenoids 92 extend pins 58 into the slots of that pallet. At this time, the pins are spaced from the top of the slots 54,56, so the elevator mechanism lowers the platform 78 until the pins support the pallet. The pallet supported is just above the pallet containing the cassette that was previously read. At this time, the cassette in the pallet supported by pins 58 can be withdrawn from the pallet and fed to the reader 90 for processing the image thereon, as explained previously. This process is repeated until all cassettes in stack of pallets have been read.

When the pins 58 are extended and are effective to support one pallet in the stack, it is preferred that the elevator 17 be lowered sufficiently so that the pallet supported by pins 58 is spaced slightly from the next lower pallet, if any. Since the pallets below the one supported by pins 58 contain cassettes that have been read by the reader 90, these lower pallets can be removed from the platform during the reading of a cassette from the pallet supported by the pins 58. Also, it will be observed that the autoloader is open at the top above the pallets. This enables new pallets with unread cassettes to be added to the top of the stack at any time in the process without stopping operation of the autoloader or the associated reader.

The method of operation described enables cassettes that have been read to be recycled rapidly without waiting on the unread cassettes to be fed to and removed from the reader 90. Also, new pallets with unread cassettes can be added to the stack at any time. This is a very efficient mode of operation and does not require constant attention by the operator. In this regard, once a stack is placed on platform 78, suitable sensors and controls can be provided to cycle through an entire stack of pallets without any operator intervention.

The invention has been described in detail with particular reference to a preferred embodiment thereof, but it will be understood that variations and modifications can be effected within the spirit and scope of the invention.

I claim:

1. An autoloader for a computed radiography reader, the autoloader being adapted to receive a plurality of pallets with each pallet having thereon a cassette containing a photographic element to be provided to the reader, each cassette having means for registering on a surface of the pallet, and the pallets having side rails for stacking the pallets one above another, the side rails or each pallet having an opening therein, the autoloader comprising:

a platform for receiving one or more pallets each containing a cassette, means connected to the platform for raising and lowering the platform relative to the reader; and means for engaging the openings in the side rails of the pallet to support and hold the pallet independent of the platform at a predetermined location relative to the reader.

2. Apparatus for providing photographic elements from cassettes to a computed radiography reader, the apparatus comprising:

a platform located adjacent the reader, an elevator mechanism connected to the platform for raising and lowering the platform relative to the reader, at least one pallet supported by the platform, a cassette containing a photographic element supported by the pallet, means on the pallet and the cassette for locating the cassette at a predetermined position on the pallet, and means engagable with the pallet for supporting and holding the pallet and cassette independent of the platform at a position relative to the reader so the cassette can be furnished to the reader.

3. Apparatus as set forth in claim 2, wherein a plurality of pallets with cassettes thereon are located on the platform, and wherein the supporting means comprises upright supports adjacent the platform, a plurality of pins carried by the supports, each pin being moveable between (1) an extended position wherein the pin engages a pallet and (2) a retracted position wherein the pin is spaced from the pallet to allow the pallet to be moved by the platform, and means for moving the pins between their extended and retracted positions so that the pins can engage a pallet to support it independently of the platform or release the pallet for travel with the platform.

4. An apparatus for providing photographic elements from cassettes to a computed radiography reader, the apparatus comprising:

a platform located adjacent to the reader, for supporting and holding a pallet having a cassette placed thereon, said cassette containing a photographic element;

an elevator mechanism connected to the platform for raising and lowering the platform relative to the reader;

means engagable with the pallet for supporting and holding the pallet and cassette independent of a platform at a position relative to the reader so that the cassette can be furnished to the reader for reading of the photographic element contained therein, said supporting means comprising of support means adjacent to the platform said support means having a plurality of pins, each moveable between an engage position wherein pins engage a corresponding opening provided in the pallet and a retracted position wherein the pins are retracted from the opening in the pallet, and means for moving the pins between their engaged and unengaged position so that the pins engage the pallet it supports independent of the platform or releases the pallet for travel with the platform.

* * * * *